United States Patent [19]

Summers et al.

[11] Patent Number: 4,593,244
[45] Date of Patent: Jun. 3, 1986

[54] DETERMINATION OF THE THICKNESS OF A COATING ON A HIGHLY ELONGATED ARTICLE

[75] Inventors: Warwick R. Summers, New Lambton Heights; Rodney C. Cross, Abbotsford, both of Australia

[73] Assignees: Australian Wire Industries Pty. Ltd.; John Lysaght Australia Limited, both of Sydney, Australia

[21] Appl. No.: 520,148

[22] Filed: Aug. 4, 1983

[30] Foreign Application Priority Data

Aug. 6, 1982 [AU] Australia ............................. PF5249

[51] Int. Cl.[4] .................. G01B 7/10; G01R 33/12
[52] U.S. Cl. ..................................... 324/230; 324/234
[58] Field of Search ................... 324/229–231, 324/236, 237, 234, 238

[56] References Cited

U.S. PATENT DOCUMENTS

| 2,326,344 | 8/1943 | Elmendorf et al. | 324/237 X |
|---|---|---|---|
| 2,703,384 | 3/1955 | Rendel | |
| 2,916,694 | 12/1959 | Hanysz et al. | |
| 3,255,405 | 7/1966 | French | 324/234 |
| 3,585,495 | 6/1971 | Kubo et al. | 324/234 X |
| 3,757,208 | 9/1973 | Brunner | 324/230 |
| 3,854,084 | 12/1974 | Parker | 324/234 |

FOREIGN PATENT DOCUMENTS

| 2615229 | 10/1976 | Fed. Rep. of Germany . | |
|---|---|---|---|
| 956132 | 1/1950 | France . | |
| 845712 | 8/1960 | United Kingdom | 324/236 |
| 858283 | 1/1961 | United Kingdom . | |
| 979121 | 1/1965 | United Kingdom . | |
| 1070859 | 6/1967 | United Kingdom . | |
| 1295460 | 11/1972 | United Kingdom . | |
| 1312710 | 4/1973 | United Kingdom . | |
| 1484696 | 9/1977 | United Kingdom . | |

OTHER PUBLICATIONS

"Ceramic Thickness Gage"; *Instruments* vol. 24, Jun. 1951, pp. 692 and 694.

Hanysz, Eugene A., "Swept Frequency Eddy-Current Device to Measure Overlay Thickness", *The Review of Scientific Instruments*, vol. 29, No. 5, May 1958, pp. 411-415.

Latter, T. D. T., Measuring the Thickness of Protective Coatings by Eddy Currents, British Journal of NDT, vol. 14, No. 4, Jul. 1972, pp. 122, 123.

*Primary Examiner*—Gerard R. Strecker
*Attorney, Agent, or Firm*—Poms, Smith, Lande & Rose

[57] ABSTRACT

A method for facilitating the determination of the thickness of a coating on an article, especially a highly elongate article such as a wire, having a ferromagnetic substrate for the coating, the coating being electrically conductive and of substantially lower magnetic permeability than the substrate, includes disposing in proximity to the article an inductively wound wire coil while applying an alternating electrical current to the coil. An electrical property of the coil is monitored for deriving a signal or other indication representative of the monitored property. The thickness of the coating may be determined from this indication. Apparatus for performing the method includes an inductively wound wire coil positionable in proximity to the article; a circuit for applying an AC current to the coil; and circuitry for monitoring the electrical property and deriving the signal or other indication.

25 Claims, 10 Drawing Figures

RESULTS FOR SHEET SAMPLES AT 2.1MHz

DETERMINATION OF THE THICKNESS OF A COATING ON A HIGHLY ELONGATED ARTICLE

This invention relates to the determination of the thickness of the coating on an article, especially a highly elongate article such as wire, strip or the like, having a ferromagnetic substrate for the coating. Coatings to which the invention is applicable are typically electrically conductive and of substantially lower magnetic permeability than the substrate, usually non-ferromagnetic. An especially advantageous application of the invention is to the continuous on-line determination of the coating thickness on metal-coated steel wire, for example galvanised steel wire.

A principal technique for galvanising steel wire is the hot dip process in which the wire is passed through a molten zinc bath and then drawn upwardly through wiping and flash cooling stations. It is desirable to ensure that wire being produced in accordance with a particular specification reliably meets that specification, and accordingly a variety of methods have been used for determining the thickness of the zinc coating. It is to be understood that a significant constraint on such determinations is the production practice of drawing a large number of wires, up to 40, in parallel formation through the galvanising plant.

One commercial method of determining the coating thickness is to cut a sample length of the wire and to chemically remove the coating from the sample. The thickness of the coating is derived by comparing the weight of the wire sample with and without the coating, or by measuring the volume of hydrogen generated by the chemical removal. Where the sample is taken on-line, such is usually confined to the ends of production lengths: it will be readily appreciated that such an approach does not necessarily provide quality assurance throughout the production length and it is thought that the measurement of end samples may not necessarily be representative.

In part to meet these objections, an alternative sampling method has been employed in which a sample of standard length is taken, say, from every third loop of a very long length of product wire on the basis that the long length is itself a reliable production sample. This approach does not permit concurrent control of the coating process and, despite the effort and time involved, represents only one of the multiple wire runs.

Another prior static measurement method entails spot determination with a magnetic probe. The probe relies upon the reduction in magnetic field with distance separating the probe head from the steel core. With this technique, many readings are required to define an average coating and the technique is limited by the wire diameter, as reading errors are introduced by the surface curvature of small wires.

A further group of prior measurement methods involves gauging techniques. In the simplest, static, case, a micrometer hand gauge is employed to make spot comparisons between the pre-coated wire diameter and the coated wire diameter. This approach also requires many readings to define an average coating, especially since metallic wire coatings are known to vary substantially on the micro scale.

For the purposes of continuous measurement of wire coatings, both optical and contact gauging methods have been applied successfully to coatings that are significant in relation to the wire diameter, for example coatings such as plastic coatings of the order of 0.5 mm or higher. Optical gauging makes use of a shadowgraph in which a parallel beam of light is passed across the wire to form a shadow the width of which is measured and relates directly to the wire diameter. Contact gauges usually operate via levers, rollers and position sensors. The rollers are in contact with the material being measured and the diameter is derived from a measurement of the relative displacement of these contact rollers.

Both the optical and contact gauging methods tend to take readings across a specific diameter of the wire and hence errors, including consistent errors, can be introduced by ovality of the uncoated wire or non-uniformity of the coating. Secondly, it has been found that the environment of a steel wire hot dip coating plant is such that optical instruments and precise contact type gauging instruments require continuous attention to assure their accuracy. A third limitation has already been implied: gauging techniques become less reliable with small diameter wires in which the coating thicknesses are of the order of the diameter tolerance of the feed wire. In these cases, direct gauging techniques at least necessitate correlated measurements before and after galvanising for reliable operation.

Although sophisticated non-contact, radiation type continuous on line coating gauges have been employed in, for example, the production of steel strip for many years, these are not adaptable to the wire application. Such non-contact methods, which have proven very effective in the steel strip industry, have involved the use of radioactive isotopes and X-ray fluorescence but have not been applicable to wire because they are suited only to a flat surface and cannot accommodate the geometry of wire. The multiple nature of a hot dip coating plant is also a serious constraint: known radiation-style units are complex and expensive and are not readily and reliably able to be installed for multiple, closely spaced parallel wires. It will be appreciated that, in such an environment, reliability, simplicity, low unit cost and ease of maintenance are important factors.

It will be seen from the preceding discussion, all of the existing techniques for the determination of the coating thickness of steel wire, in particular the zinc coating thickness of galvanised steel wire, suffer from one or more significant disadvantages. It is an object of the invention to provide a method of and apparatus for facilitating the continuous on-line determination of the coating thickness of metal coated steel wire, which improves upon the aforementioned techniques.

The invention is based upon the discovery that the aforedescribed object can be met by a simple inductive technique which relies upon the response of an inductively wound coil brought into proximity to the coated article. The technique can be further enhanced by comparing the relative responses of a pair of coils, and, in the case of wire, by passing the wire through one of the coils. In the latter case, it is surprisingly found, moreover, that meaningful accurate coating measurements can be obtained without any requirement to exactly determine the dimensions of feed wire of known nominal diameter, and that sensitivity can be optimised by careful choice of coil geometry and of the frequency of the current applied to the coils. Furthermore, through the implementation of electronic signal analysis methods, the instrument can be arranged to function for a large range of wire diameters.

The invention accordingly provides, in a first aspect, a method for facilitating the determination of the thickness of a coating on an article having a ferromagnetic substrate for said coating, wherein the coating is electrically conductive and of substantially lower magnetic permeability than the substrate, comprising:

disposing in proximity to the article an inductively wound first wire coil while applying an alternating electrical current to said coil; and monitoring an electrical property of the coil and deriving a signal or other indication representative of the monitored property from which indication the thickness of the coating may be determined.

Preferably, the alternating electrical current is simultaneously applied to a second inductively wound wire coil reference displaced from the article so that the article does not significantly affect its inductance, and said electrical property of the respective coils is monitored whereby said derived signal or other indication is representative of a comparison between the monitored properties.

The article may be highly elongated, in which case the first mentioned coil is advantageously disposed in proximity to the article by relatively moving the article longitudinally through said wire coil, especially where the article is wire.

The method may further entail determining and displaying a reading of the coating thickness and/or using said signal or other indication to vary and/or control the thickness of the coating.

The invention also provides monitoring apparatus for facilitating the determination of the thickness of a coating on an article having a ferromagnetic substrate for said coating, wherein the coating is electrically conductive and of substantially lower magnetic permeability than the substrate, comprising:

an inductively wound wire coil positionable in proximity to the article;

means for applying an alternating electrical current to the coil;

means for monitoring an electrical property of the coil and deriving a signal or other indication representative of the monitored property, from which indication the thickness of the coating may be determined.

The invention still further provides, in a second aspect, on line monitoring apparatus for facilitating the determination of the thickness of a coating on a highly elongate article having a ferromagnetic substrate for said coating, wherein the coating is electrically conductive and of substantially lower magnetic permeability than the substrate, comprising:

a pair of inductively wound wire coils;

means to relatively move said article through a first of said coils, longitudinally with respect to both the article and the coil, the other coil then being a reference coil displaced from the article;

means for applying an alternating electrical current to the respective coils; and means for monitoring an electrical property of the respective coils and deriving a signal or other indication representative of a comparison between the monitored properties, from which indication the thickness of the coating may be determined.

The reference wire coil may be advantageously disposed in the vicinity of the first or measurement coil, for example parallel to the measurement coil, but at a sufficient displacement so that the moving article does not significantly affect its inductance. Alternatively, the reference wire coil may be placed a considerable distance from the measurement coil, for instance in a process control room. It has been found that the technique achieves highly satisfactory performance where the core of the reference coil is simply air. It has also been found preferable for the two coils to be geometrically similar and in particular to be similarly wound.

In an especially suitable application, the elongate article is metal-coated steel wire, for example galvanised steel wire, copper, aluminium or zinc-aluminium alloy coated wire, or tyre cord comprising very thin bronze-coated steel wire.

It is desirable that the parameters of the applied current are chosen to avoid magnetic saturation of the substrate: it has been established that the technique gives satisfactory results at flux densities of the order of 25 gauss. The frequency of the applied current is also selected within the aforementioned range so as to give a skin depth, calculated from the following well-known formula, from two to four times the expected coating thickness:

$$\delta = \left( \frac{\lambda}{\pi \sigma \mu c} \right)$$

where $\delta$ is the skin depth for a signal wavelength $\lambda$ in air, c is the velocity of light, and $\sigma$ and $\mu$ are respectively the relative permeability and conductivity of the coating.

It has been observed that adequate sensitivity to variations in coating thickness is achieved with this selection of frequency. Generally, the minimum is 10 KHz. In the commercially important case of hot dip metal coatings on steel wire, it has been found that frequencies in the range 10 KHz to 200 KHz are satisfactory, and that the range 50 to 140 KHz is especially preferred. Using one coil with sheet, a suitable preferred range is 400 to 600 KHz.

It may readily be shown that, at any given frequency, the skin depth in the coating is significantly greater than in the substrate, for example about ten times greater in the case of galvanised steel wire. It will be understood that this effect results in a preferential signal selection of the surface coating over the substrate material, thus improving sensitivity to coating characteristics over the substrate material characteristics.

The axial length-to-diameter ratio of the measurement coil is chosen so that the inductance of the coil, and therefore the sensitivity of the apparatus, are not affected by lateral displacement of the article within the coil. Applying known principles, the preferred ratio is therefore in the range 4:1 to 8:1, most preferably about 5:1 for good performance but convenient geometry.

The electrical property of the coil or respective coils which is monitored for deriving said signal or indication may conveniently be the electromotive force (EMF) across the coils. Either the amplitudes or the phase angles may be monitored and, where the reference coil is provided, compared.

In one arrangement of the pair of coils, the respective coils are connected as parallel RL circuits across the output of a precision oscillator. A detection circuit connected across corresponding terminals of the coils comprises an isolation transformer and a display coupled to the output of the transformer via a suitable amplifier. In an alternative arrangement, emf is applied across the two coils arranged as series elements in one arm of a bridge while the two resistors in series comprise the second arm, and a detection circuit is connected to the function points of the two coils and two resistors.

In order to further exemplify the invention, reference is made to the accompanying drawings, in which.

Figure 1:
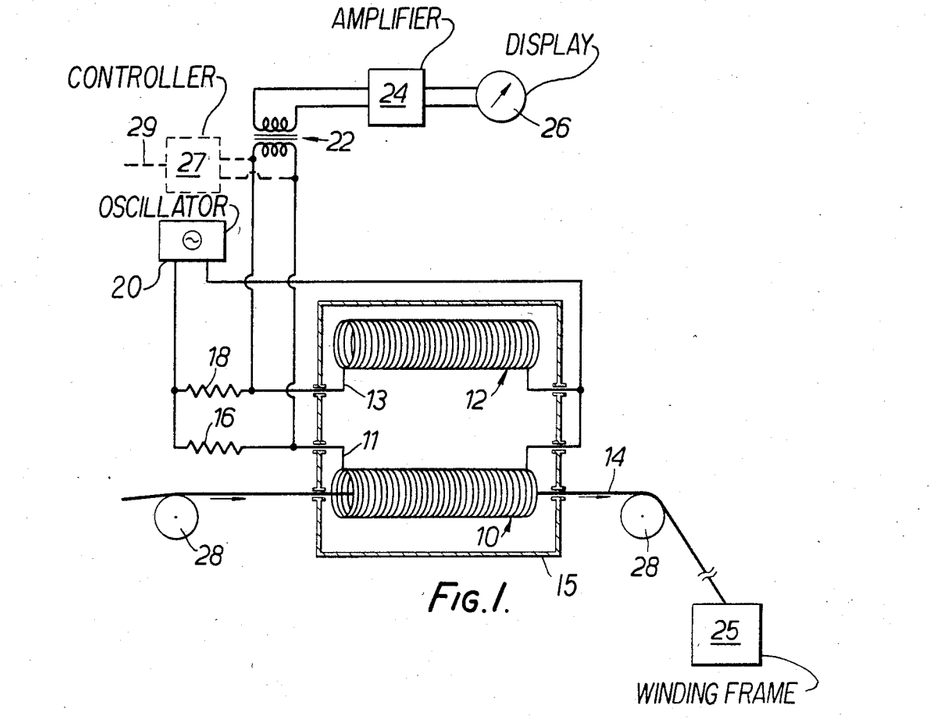
FIG. 1 is a schematic diagram of on-line apparatus in accordance with a first embodiment of the invention for monitoring coating thickness on a single running wire, using two coils.

The apparatus of FIG. 1 includes a pair of inductively wound wire coils 10, 12. Coil 10, the measurement coil, is fixed in position about the path of one galvanised wire 14 of a multiple wire hot dip galvanising plant, downstream of hot dip and wiping unites, while coil 12, the reference coil, is positioned in any other convenient location. This location may well be in the vicinity of the measurement coil 10 as depicted in the drawing, but coil 12, should be sufficiently displaced from wire 14 so that the wire does not significantly affect the inductance of the coil. When the coils are proximate, they are typically protected by a common electromagnetic shield 15.

The coils are geometrically similar in every respect including being similarly wound on similar formers, are both hollow so as to have air cores, and are connected in series with respective resistors 16, 18. The two RL circuits are coupled in parallel across the output of a selectively variable-frequency precision oscillator 20.

Each coil 10, 12 has a diameter of the order of 20 to 30 mm and a length-to-diameter ratio of about 5:1 to ensure, in accordance with the earlier discussion, that the results are not sensitive to lateral movement of wire 14 within coil 10.

The respective terminals 11, 13 of coils 10, 12 connected to the resistors 16, 18, are coupled across one coil of an isolation transformer 22. The other coil of the transformer 22 is connected to an amplifier 24 which outputs to a suitable display 26. It will be observed that the circuit as a whole constitutes an electrical bridge arrangement.

In operation, a newly hot dip galvanised wire 14 is drawn by a winding frame 25 substantially axially longitudinally through coil 10, guided by rolls or like guides 28 while an alternating current of frequency selected according to the aforedescribed principles is applied to the two coils by oscillator 20. Display 26 provides an indication representative of the observed difference between the amplitudes of the electromotive force across the two coils.

Figure 2:
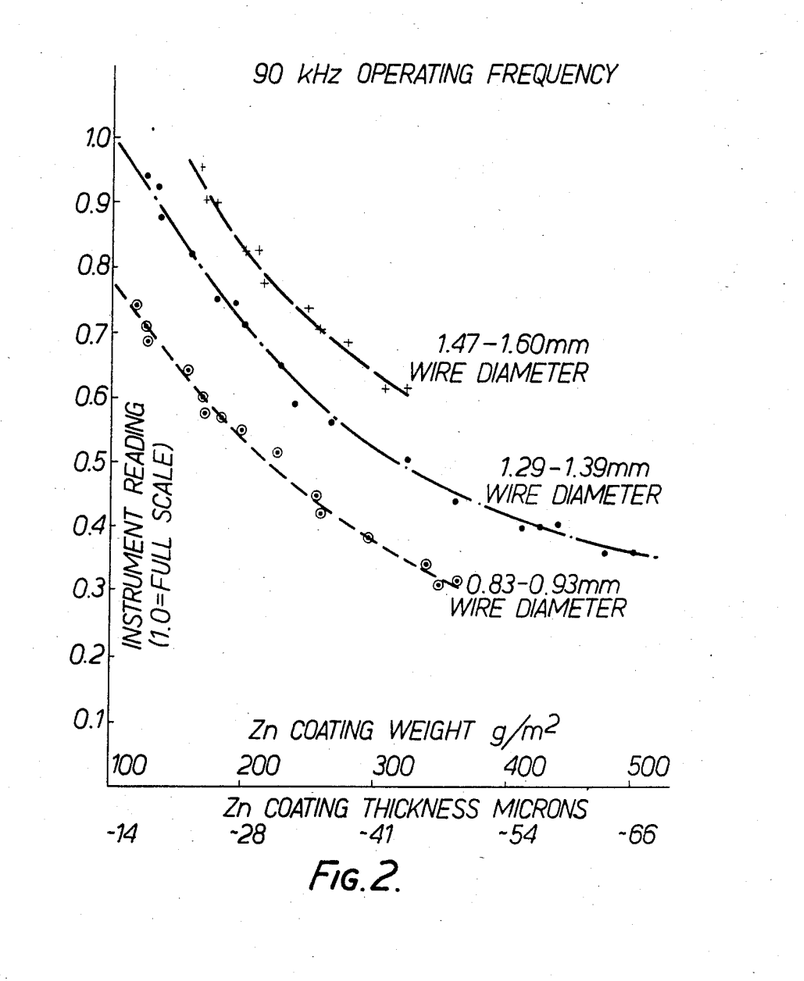
FIG. 2 is a graphical representation of exemplary trial applications of the apparatus to galvanised steel wire when the measurement and reference coils were similarly inductively wound.

It was found that by suitable calibration, the indication at display 26 can be read to give the thickness of the coating. This can be appreciated from FIG. 2, which demonstrates conclusively that the method can be employed to give meaningful and sensitive results. This drawing is a plot of instrument readings against approximate zinc coating thickness and weight for various steel wires of diameters within one of three different ranges at a selected frequency of 90 kHz. The ranges arise from the tolerances for wires of particular nominal diameters. The coating thicknesses were determined by conventional techniques. It will be observed that meaningful calibration curves can be drawn, with excellent fit to the experimental plots for each diameter range, thus suggesting that there is no need to determine exact diameter where nominal diameter is known.

It will be understood that a signal derived from the comparison may be passed to a feedback control circuit 27 coupled by line 29 to the associated wiping unit (not shown) of the galvanising plant in order to automatically control coating thickness. Moreover, in a typical multiple wire plant, microprocessor technology may be employed to process, log and present the required information in any specified format, including as a set of feedback control signals.

Figure 3:
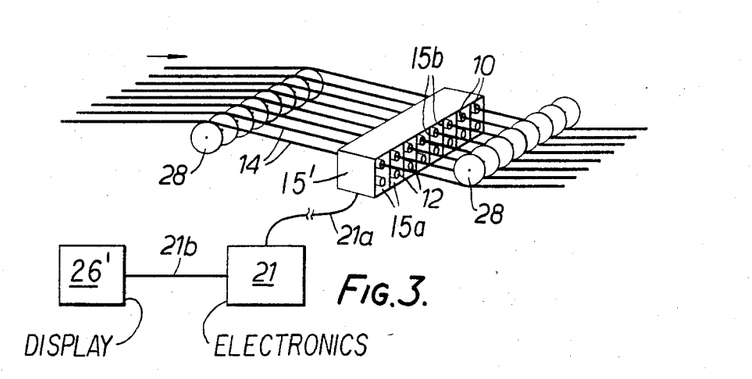
FIG. 3 diagrammatically depicts a segment of multiple wire coating plant fitted with apparatus according to the invention.

FIG. 3 schematically depicts a segment of wire coating plant adapted to process multiple parallel running wires, wherein there is a separate measurement coil 10 and reference coil 12 for each wire 14. The pairs of coils are housed within respective compartments 15a of an electromagnetic box shield 15' fitted with dividers 15b to shield the coils from each other and from other wires. The amplifier, display and associated electronics are mounted separately at 21, being coupled to the coils by cable 21b. Computer 27' would be used to automatically control coating thickness upstream of the illustrated segment of the plant. FIG. 3 shows only eight wires: such plants may presently have up to 40 wires. Moreover, instead of mounting the coils in a common shield as depicted, each pair may be independently disposed further down the line where the wires separate on approaching their separate winding frames. Finally, there may be fewer reference coils than measurement coils, for example a single reference coil for each pair of measurement coils.

Figure 4:
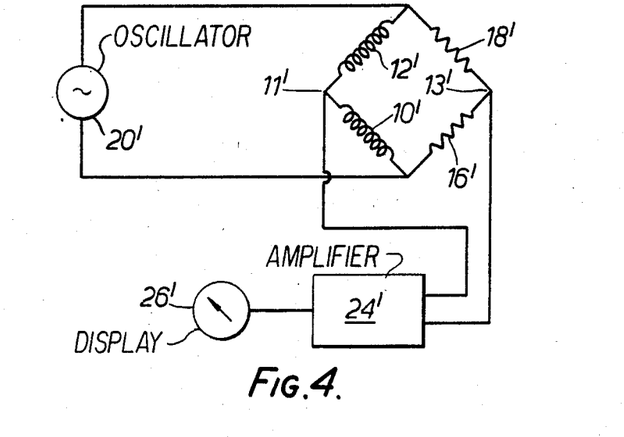
FIG. 4 is a circuit diagram of apparatus according to a second embodiment of the invention, for use with wire.

FIG. 4, in which like parts are indicated in like reference numerals, is a circuit diagram of an alternative arrangement for monitoring and comparing the response of measurement coil 10' and reference coil 12'. The coils are, as before, similarly inductively wound and geometrically similar, but in this case are connected in series across oscillator 20'. A pair of similar series-connected resistors 16', 18' is also coupled across the oscillator, in parallel with the coils. An amplifier 24', is connected to the function points 11', 13' of the two coils and two resistors in the resultant bridge arrangement. As before, detector amplifier 24' outputs to a suitble display 26'.

Figure 5:
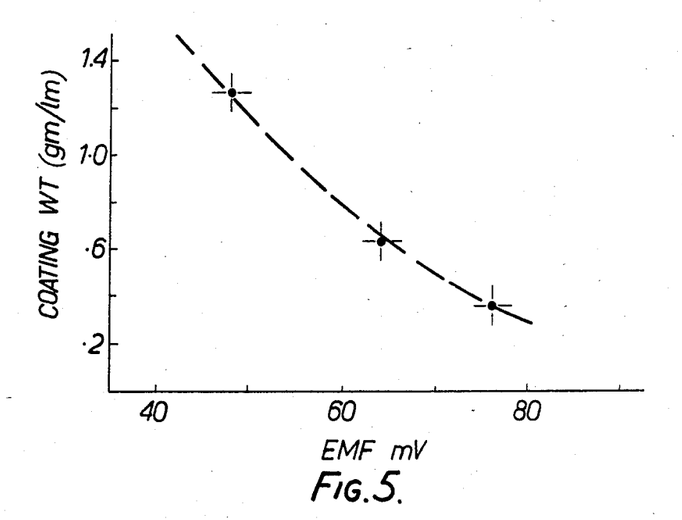
FIG. 5 is a graphical representation similar to FIG. 2, but for copper coated wire and using apparatus according to FIG. 4.

The application of apparatus arranged according to FIG. 4 is demonstrated in FIG. 5. Here, coating weight (as determined by conventional techniques) is plotted against reading of display 26' for copper coated wire. A near-linear curve can be fitted to the points plotted.

In either embodiment, amplifier 24, 24' may be substituted by a phase-sensitive detector for comparing the phase angles rather than the amplitudes of the emf across the coils.

Figure 6:
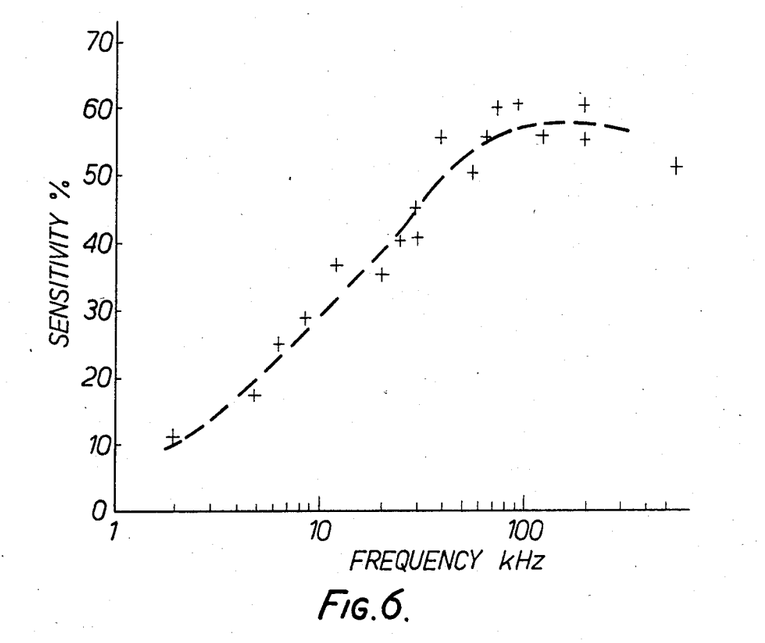
FIG. 6 is a plot of measurement sensitivity against frequency of the current applied to the coil, using apparatus according to FIG. 4.

FIG. 6 demonstrates the effect of frequency on measurement sensitivity, for the apparatus of FIG. 4. It is considered from these results that the frequency should be higher than 10 kHz for reasonable sensitivity, and that there is little benefit in terms of sensitivity in increasing frequency above 200 kHz. A good working range is 50 to 140 kHz.

Figure 7:
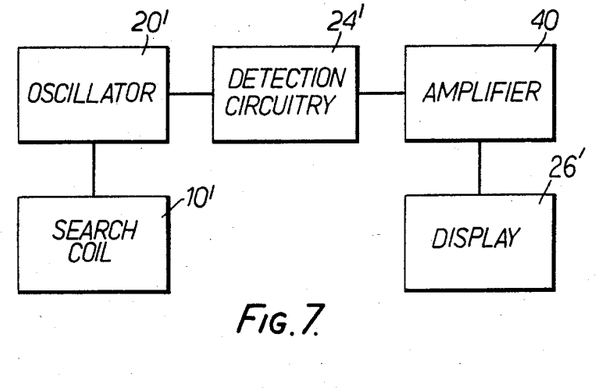
FIG. 7 is a block circuit diagram of single-coil apparatus for measuring coating thickness on a sheet.
Figure 9:
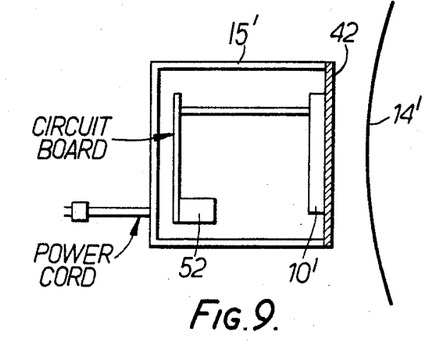
FIG. 9 is a diagrammatic elevation of the measurement head of the apparatus of FIG. 7.
Figure 10:
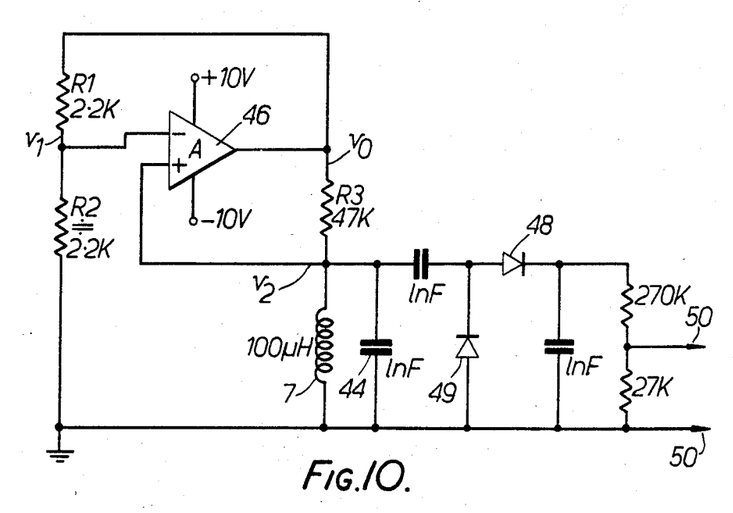
FIG. 10 is a more detailed circuit diagram of the apparatus of FIG. 7.

FIGS. 7, 9 and 10 depict a second embodiment of apparatus according to the invention which utilizes only one coil and is especially adapted to the determination of coating thickness on a sheet. This embodiment comprises a single inductively wound coil 10', hereinafter called the search coil, an oscillator 20', detection circuitry 24' for measuring the amplitude of oscillation, an amplifier 40, and a display device 26' all connected together as shown. The search coil 10' is actually the oscillator tank coil. Thus, the amplitude of oscillation depends on the impedance of the coil 10' and this is related to the coating thickness being monitored. Such an arrangement can be made sensitive to small changes in impedance of the tank coil. The oscillator feedback components are preferably chosen so that the circuit only just oscillates with small amplitude when the search coil is correctly spaced from uncoated steel. The oscillation amplitude is measured by the detection circuitry in terms of the AC voltage across the tank circuit, detected with a diode to convert the AC signal to the DC signal. That signal is amplified with an operational amplifier and fed to a meter, oscilloscope or chart recorder for convenient visual display.

In more detail, with reference to FIGS. 9 and 10, the search coil 10' and associated electronic circuitry are housed in a metal, preferably aluminium, box 15' in order to shield the coil 10' from dust, electromagnetic interference, other metallic objects and blasts of hot or cold air. The side of the box facing a steel strip 14' is sealed with a non-conductive, for example epoxy fibreglass, lid 42 to allow the magnetic field of the search coil 10' to penetrate out of the box 15' and into the strip 14'. The box 15' itself is attached to a rigid frame (not shown) to maintain the search coil 10' at a fixed distance, approximately 50 mm, from the strip 14' as it passes over a roller. The search coil 10' is constructed of resistance wire to minimise the effects of temperature changes in the coil and may consist of 20 turns wound on a 15 cm diameter glass former. The coil 10' may be secured to the former with epoxy resin which also acts to seal out dust and moisture.

The oscillator and detection circuitry used in the prototype gauge is shown in FIG. 10. The frequency of oscillation, about 500 kHz, is determined by the self resonant frequency of the tank circuit comprising the coil 10' and capacitor 44. The impedance of the tank circuit is approximately 4.7 k$\Omega$ and the voltage $v_2$, across the tank circuit is approximately equal to $v_1$, both being about half the output voltage of an operational amplifier 46. Careful adjustment of voltage dividing resistor $R_2$ is required to bring the circuit into oscillation, due to the very high open loop gain of the amplifier. The amplitude of oscillation is a very sensitive function of the impedance of the tank circuit. Consequently, the voltage $v_2$ provides a sensitive indication of coating thickness on strip located near the search coil 7.

Detection diodes 48 and 49 convert the AC voltage to a DC voltage which is monitored by a DC voltmeter or chart recorder (not shown) connected to output terminals 50. In practice, the output voltage changes by a factor of two for a change in coating thickness from 50 gm/m$^2$ to 350 gm/m$^2$ of zinc or iron strip located 50 mm from the search coil.

Power for the oscillator 20' is provided by regulated and temperature compensated +10 volt and −10 volt supplies. All temperature sensitive components are mounted in an oven 52 which is temperature stabilized at 45.0° C.±0.2° C. Bench tests have established that the tank circuit voltage remains stable within ±0.3% over an ambient temperature range from 10° C. to 40° C., which is the range encountered near a steel strip galvanising line.

The sensitivity of the apparatus to variations in coating thickness can be adjusted by changing the feedback in the oscillator. For example, feedback can be chosen so that the oscillation amplitude is zero when the coating thickness is less than a certain value $T_o$, or when the thickness is zero. In addition, if one is interested in a limited range of coating thickness, t, between $t_1$ and $t_2$, the detected signal can be compared with a preset level which is adjusted so that the displayed signal is zero for $t \leq t_1$. Signal amplification can then be adjusted so the displayed signal is a maximum for $t = t_2$.

Figure 8:
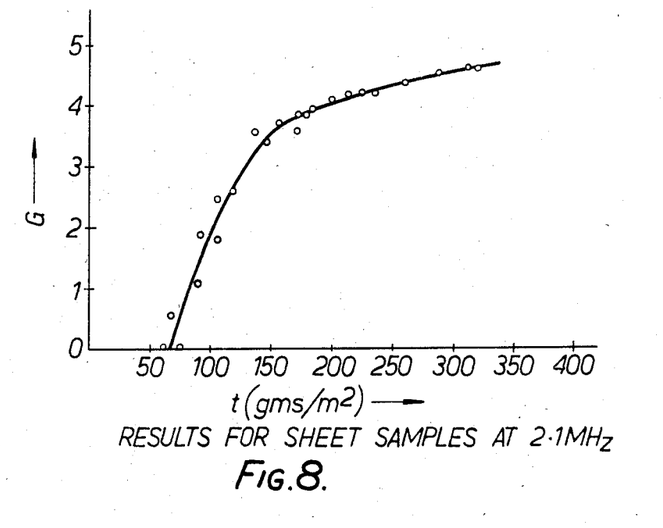
FIG. 8 is a calibration curve for the apparatus for FIG. 7.

FIG. 8 demonstrates the reliability and accuracy of the FIG. 7 apparatus, and constitutes an exemplary calibration curve. Sheet samples were placed 50 mm from the end of a search coil wound with constant in wire and of diameter 50 mm. The operating frequency was 2.1 MHz. There were 12 sheet samples of varying coating weights and base material thicknesses, taking measurements on either side of the sheet. Although there is some scatter, the results in FIG. 5 show a clear trend of output reading, G, vs coating weight, independent of the base metal thickness. The scatter in results was probably due to distance variations associated with bending of the sheet samples. The sheet samples were not perfectly flat, but slightly buckled. The actual coating weights for the sheet samples were determined to within ±5 gm/m$^2$ by a weigh-strip-weigh acid etch technique using samples adjacent to those used with the apparatus under test.

In a further embodiment of the single coil case, the search coil may be part of a resonant circuit fed from a separate generator. The resonance frequency is chosen according to the skin depth requirements discussed above. The generator frequency is chosen so that it is the same as or close to the resonance frequency. Changes in impedance of the search coil are detected either by direct sensing of the voltage or current in the resonant circuit or by utilising a bridge circuit. Changes in impedance are monitored in terms of changes in either the amplitude or the phase of the detected signal with reference to the generator signal.

The sensitivity of the single coil apparatus depends very strongly on the distance between the coil and the sheet due to the strong variation of magnetic field strength with distance beyond the end of the coil. It is possible to reduce the sensitivity on distance by using a coil of large diameter, but the coating thickness is averaged over large dimensions. In practice, a compromise can be reached depending on how well the distance variations can be controlled. Placing the measurement head near a roller over which the sheet passes is a suitable practical way of reducing distance variations.

The magnetic field on the axis of a solenoid varies approximately as the inverse distance near the end of the solenoid but as the inverse distance cubed at distances large compared with the solenoid radius. Consequently, one might expect that distance variations would have a smaller effect if the solenoid is placed as close as possible to the sheet. However, the opposite situation was observed during experiments leading to the present invention. A change in distance of say 1 mm has a larger effect when the coil-sheet separation is 20 mm than it does at say 50 mm. The relative change in magnetic field strength is smaller at large distances, for a given change in distance, since the relative change in distance is smaller. This effect is only marginal however, and one would normally wish to place the coil as close as possible to the sheet to improve sensitivity. One might also expect that a short multilayer coil should be used in preference to a long, single layer solenoid, since all turns of the coil are then close to the sheet. However, such a coil has a low Q and it turns out that such a coil is no better or not worse than a single layer solenoid, except perhaps that a solenoid is geometrically more stable.

One method of minimising the effect of distance variations would be to use two coils, one each side of the sheet, and average the readings electronically. Alternatively, one could apply the principle of the first-described embodiment (FIG. 1) and use a single coil surrounding the whole sheet to produce a more uniform magnetic field near the sheet. Both of these alternatives provide a coating thickness averaged over both sides of the sheet. A single coil facing one side only responds to coating thickness variations on only one side of the sheet.

The change in impedance of a solenoid coil, when it is placed near sheet or around wire, is very small. To take a typical example, consider a solenoid of diameter 50 mm with 20 turns and length 20 mm. The inductance of such a coil is approximately 25 $\mu H$ and the AC resistance at 500 kHz will be of the order of 0.5–2 $\Omega$ depending on the type of wire used and its diameter. When galvanized sheet is placed 12 mm away from the end of the coil, the inductance decreases by about 10% and the AC resistance increases by about 250 m$\Omega$, regardless of the DC resistance of the coil. When the sheet is 50 mm from the end of the coil, the inductance decreases by only about 0.4% and the AC resistance increases by only about 40 m$\Omega$ for a coating thickness of 100 gm/m$^2$ or by about 18 m$\Omega$ for a coating thickness of 500 gm/m$^2$.

In order to maximimise the effect of coating thickness variations, it is desirable to use a coil with a high quality factor Q, defined as the ratio of the reactance of the coil to its AC resistance. In other words, it is desirable to use a coil with low AC resistance so that small changes in the AC resistance are easily detected. As shown in the above example, changes in AC resistance of the coil are more sensitive to changes in coating thickness than changes in inductance, at least for coils with Q exceeding about 10.

The Q of a coil can be maximised by using wire of low DC resistance such as large diameter copper wire or by using small diameter copper wires twisted in parallel to form Litz wire. The Q can be further improved by leaving a gap between adjacent turns to reduce eddy current losses in the coil itself. The Q can also be maximised by using a low dielectric loss coil former such as ceramic or epoxy fibreglass. Any electrostatic shield placed around the coil should be located as far as possible away from the coil.

We claim:

1. A method for facilitating the determination of the thickness of a coating on a highly elongated article having a ferromagnetic core of nominal diameter, wherein the coating envelops the core, is electrically conductive, and has a substantially lower magnetic permeability than the core, characterized by:

relatively moving the article longitudinally through a non-tunable, inductively wound hollow wire coil while applying to said coil an alternating electrical current of constant frequency less than 140 kHz, said current and frequency chosen to avoid magnetic saturation of the core;

monitoring an electrical property of the coil in a non-tunable circuit and deriving a signal or other indication representative of the monitored electrical property; and producing a direct indication of the thickness of the coating from the signal derived from the monitored electrical property of the coil.

2. The method according to claim 1 wherein the alternating electrical current is simultaneously applied to a second non-tunable, inductively wound hollow wire reference coil displaced from the article so that the article does not significantly affect the inductance of said reference coil and said electrical property of the respective coils is monitored whereby said derived signal is representative of a comparison between the monitored properties.

3. The method according to claim 2 wherein said second wire coil is disposed in the vicinity of said first wire coil, but at a sufficient displacement so that the reference coil reacts to the same environment as said first mentioned coil.

4. The method according to claims 1, 2 and 3 wherein the electrical property monitored is the electromotive force across the coil(s).

5. The method according to claim 4 wherein said derived signal or other indication is representative of the phase angle of the electromotive force or of the difference between the phase angles of the electromotive forces.

6. The method according to claims 1, 2 or 3, wherein the frequency of the applied electrical current is selected so as to correspond to a skin depth between two and four times the expected coating thickness while the amplitude of the applied current is selected to leave the elongated article magnetically unsaturated.

7. The method according to claims 1, 2 or 3, wherein the article is a wire.

8. The method according to claims 1, 2 or 3, further comprising using said signal or other indication to vary and/or control the thickness of the coating.

9. A monitoring apparatus for facilitating the determination of the thickness of a coating on a highly elongated article having a ferromagnetic core of nominal diameter, wherein the coating envelops the core, is electrically conductive, and has a substantially lower magnetic permeability than the core, comprising:

a non-tunable inductively wound hollow wire coil;

means to relatively move the elongated article longitudinally through said coil;

means for applying to said coil an alternating electrical current of constant frequency less than 140 KHz, said current and frequency chosen to avoid magnetic saturation of the core;

electrical circuit means connected to said coil in a non-tunable circuit for monitoring an electrical property of the coil and deriving a signal representative of the monitored property; and means coupled to the electrical circuit means for producing a direct indication of the thickness of the coating from the signal derived from the monitored electrical property.

10. The apparatus according to claim 9, further comprising a second non-tunable inductively wound hollow wire reference coil to which current is also arranged to be applied by said current applying means, and wherein said electrical circuit means is arranged such that it monitors said electrical property of the respective coils and such that said signal is representative of a comparison between the monitored properties.

11. As on-line monitoring apparatus for facilitating the determination of the thickness of a coating on a highly elongated article having a ferromagnetic core of nominal diameter, wherein the coating envelops the core, is electrically conductive and has a substantially lower magnetic permeability than the core, comprising:

a pair of inductively wound, non-tunable hollow wire coils;

means to relatively move said article through a first of said coils longitudinally with respect to both the article and the coil, the other coil then being a reference coil displaced from the article;

means for applying to the respective coils an alternating electrical current of constant frequency less than 140 kHz, said current and frequency chosen to avoid magnetic saturation of the core;

electrical circuit means connected to said coils in a non-tunable circuit for monitoring an electrical property of the respective coils and deriving a signal or other indication representative of a comparison between the monitored properties; and means coupled to the electric circuit mean for providing a direct indication of the thickness of the coating from the signal derived from the monitored electrical property.

12. The apparatus according to claim 11 wherein the wire reference coil is disposed in the vicinity of the first or measurement coil, but at a sufficient displacement so that the article does not significantly affect its inductance.

13. The apparatus according to claim 12 wherein the wire coils are protected by a common electromagnetic shield.

14. The apparatus according to any one of claims 9 through 13 wherein said monitoring means is arranged to monitor the electromotive force across the coil(s).

15. The apparatus according to claim 14 wherein said monitoring means is arranged to derive a signal representative of the phase angle of the electromotive force or of the difference between the phase angles of the electromotive forces.

16. The apparatus according to any one of claims 9 through 13 wherein said coils are similarly inductively wound.

17. The apparatus according to any one of claims 9 through 13 wherein the moving means and the first coil are configured to receive wire as the highly elongated article.

18. The apparatus according to any one of claims 9 through 13 further comprising control means responsive to said signal to vary or control the thickness of the coating.

19. The apparatus according to any one of claims 9 through 13 wherein the or each coil has a high Q factor.

20. In a multiple wire processing plant having means to guide multiple parallel running wires of respective nominal diameter along defined paths of travel, and means to draw the wires longitudinally along the respective paths, such wires having an electrically conductive coating on a ferromagnetic core substrate of higher magnetic permeability than the substrate, apparatus for determining the thicknesses of the respective coatings comprising:

multiple inductively wound, non-tunable hollow wire coils positioned about said paths of travel for the respective wires so that the wires when drawn are drawn longitudinally through the respective wire coils;

means for applying to the respective coils an alternating electrical current of constant frequency less than 140 kHz, said current and frequency chosen to avoid magnetic saturation of the core;

electrical circuit means connected to said coils in a non-tunable manner to monitor an electrical property of each coil and derive a signal representative of the monitored property; and means coupled to the electric circuit means for providing a direct indication of the thickness of the coating from the signal derived from the monitored electrical property.

21. The apparatus according to claim 20 wherein each said wire coil is associated with an inductively wound non-tunable, hollow wire reference coil positioned so that the running wire does not significantly affect its inductance, said reference coil being coupled to said current applying means and said electrical circuit means so that said derived signal is representative of a comparison between the monitored properties.

22. The apparatus according to claim 20 or 21 wherein said monitoring means is arranged to monitor the electromotive force across the coil(s).

23. The apparatus according to claim 20 or 21 wherein said coils are similarly inductively wound.

24. The apparatus according to claim 21 wherein there are fewer reference coils than coils about paths of wire travel.

25. The apparatus according to claim 20 or 21 further comprising control means responsive to said signal or other indication to vary or control the thickness of the coating.

* * * * *